W. P. JENNEY.
WAR VESSEL.
APPLICATION FILED NOV. 3, 1913. RENEWED JAN. 5, 1917.
1,313,945.
Patented Aug. 26, 1919.
2 SHEETS—SHEET 1.
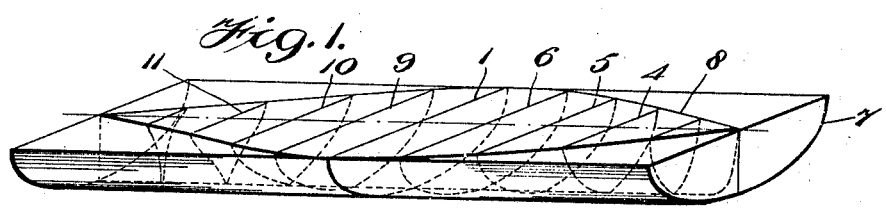
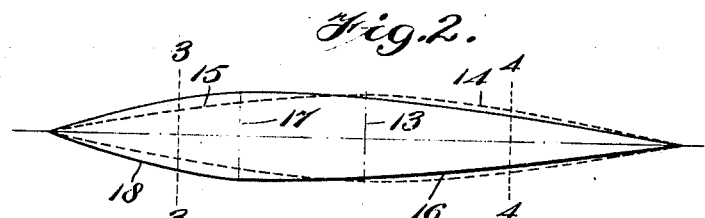
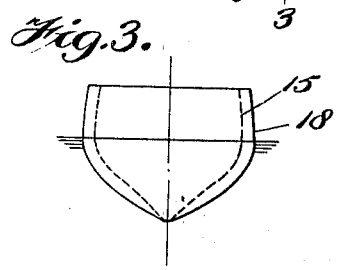
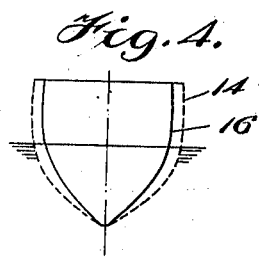
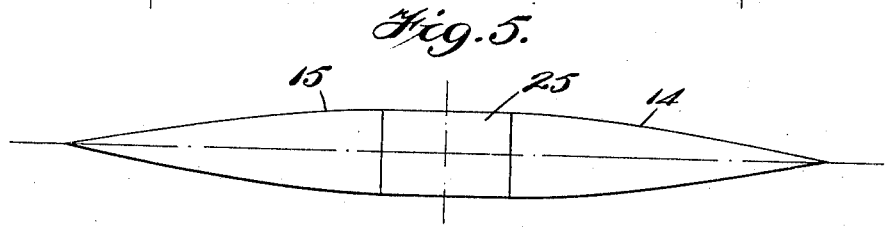
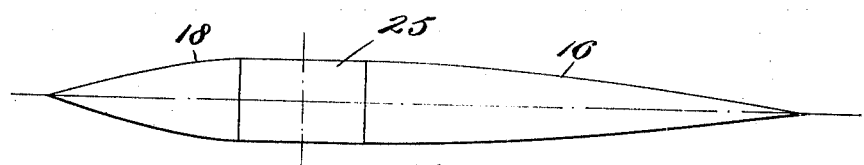

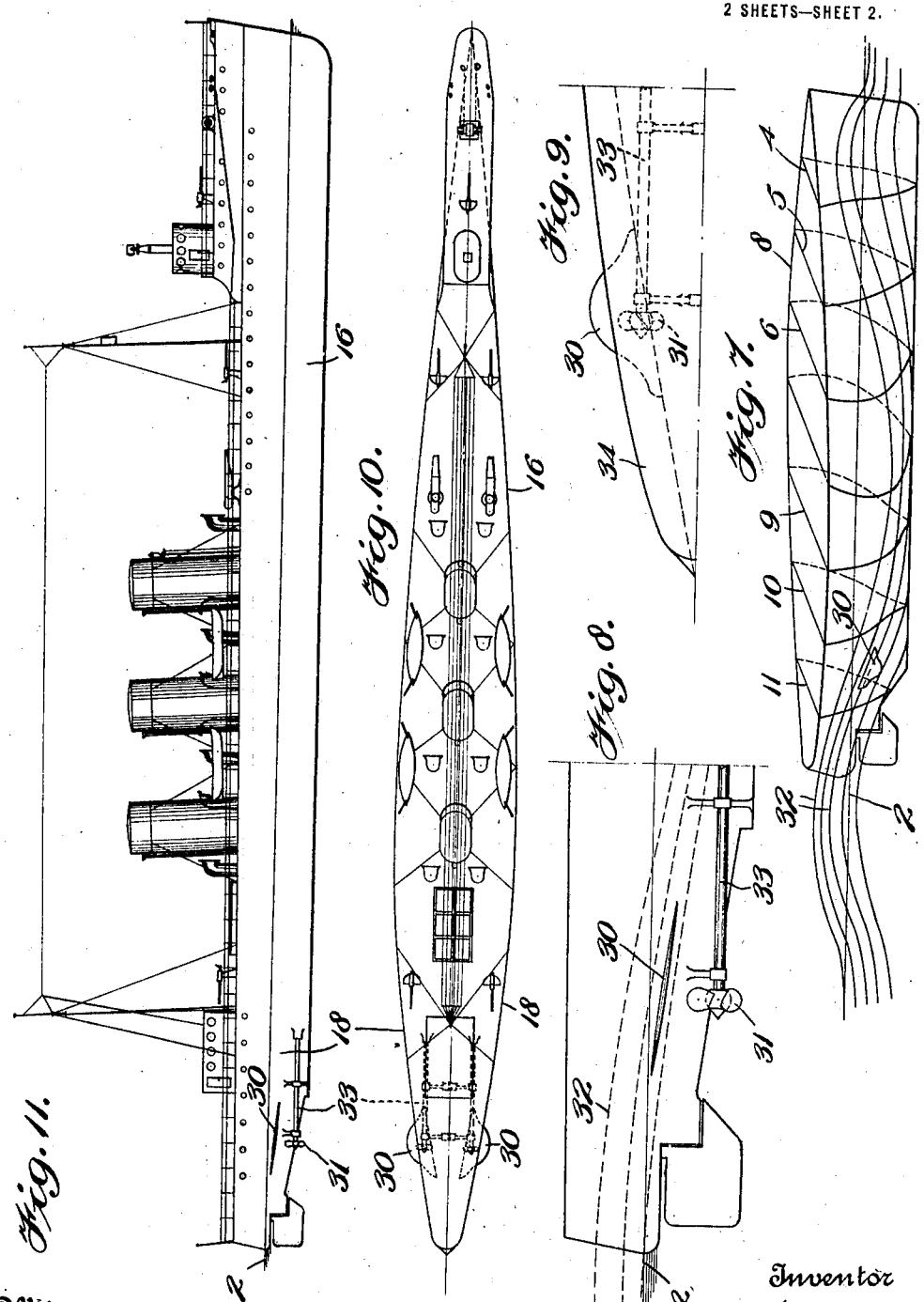

UNITED STATES PATENT OFFICE.

WALTER P. JENNEY, OF WASHINGTON, DISTRICT OF COLUMBIA.

WAR VESSEL.

1,313,945.          Specification of Letters Patent.     Patented Aug. 26, 1919.

Application filed November 3, 1913, Serial No. 798,989. Renewed January 5, 1917. Serial No. 140,842.

*To all whom it may concern:*

Be it known that I, WALTER P. JENNEY, a citizen of the United States, residing at Washington, in the District of Columbia, have invented certain new and useful Improvements in War Vessels; and I do hereby declare the following to be a full, clear, and exact description of the invention, such as will enable others skilled in the art to which it appertains to make and use the same.

My invention relates to certain radical changes in the hull of vessels for general use, namely, in the position of the greatest midship section or dead-flat, and in the relative proportions and fineness of the forebody and afterbody, and also to the employment of under water fin-guards located over the propellers, with their planes conformable to the direction of the stream lines at that part of the stern. These said improvements enable me to greatly reduce the power required to drive the vessel at a given speed.

These novel fin-guards are especially adapted for use in connection with the vessel disclosed below, but for general use, they form the subject of an application for patent filed by me, on the 8th day of November, 1913, No. 799,908, and entitled Fin guards for vessels. In fact they may be attached to the stern of any vessel, where their employment is found to be advantageous.

For structural and other reasons, as hereinafter more particularly set forth, this invention is preferably applied to vessels intended to develop high speed and having on the water line a length greater than six times the maximum beam.

Considering first the bare hull, without appendages; the usual practice in naval architecture, at the present time, is to place the maximum beam or midship section or "dead-flat" at the mid-length of the vessel, equidistant from the forward and after perpendiculars, even though the length of the forebody or the length of entrance, added to the length of the afterbody or length of run, may exceed six times the beam and in vessels designed for extremely high speed, the aggregate length of these parts may even equal a length of ten to twelve beams.

In my invention, on the contrary, the position of the maximum beam and midship section is not equidistant from the forward and after perpendiculars; but is placed abaft the mid-length of the hull, and I further employ a different coefficient of fineness in the forebody from that employed in the afterbody, all as will be clear from what follows.

Referring to the accompanying drawings forming a part of this specification and in which like numerals designate like parts in all the views:—

Figure 1 is a diagrammatic perspective view of a vessel and its equal spaced transverse sections below the water line, showing the proportions between its volume and that of an inclosing right half-cylinder having a base equal to the amidship section; which proportion is called the coefficient of fineness of the hull;

Fig. 2 is a water line plan view illustrating in full lines, a vessel built according to my invention, and in dotted lines illustrating a vessel built according to the present system;

Fig. 3 is a sectional view taken on the line 3—3 of Fig. 2;

Fig. 4 is a sectional view taken on the line 4—4 of Fig. 2;

Fig. 5 is a view of a modified form of vessel, with a parallel middle body built on the old lines;

Fig. 6 is a view similar to Fig. 5 of a vessel having the same displacement, built in accordance with my invention; and with the parallel middle body located abaft the mid-length of the vessel;

Fig. 7 is a diagrammatic perspective view showing the direction of the stream lines in vessels when under way;

Fig. 8 is an enlarged detail view showing a fin set parallel to the direction of the stream lines over the screw propeller;

Fig. 9 is a plan view of the parts shown in Fig. 8;

Fig. 10 is a deck plan view of a war vessel built in accordance with my invention; and, Fig. 11 is a view in elevation of the parts shown in Fig. 10.

That the nature of my invention may be more clearly understood, a new principle in naval architecture, discovered by me, on which this invention is based, will now be set forth, namely; that in any vessel of normal form, having a length of six or more beams, the position of the maximum beam most favorable for speed is influenced and determined by what I call the optimum length of run. This said length of run for a given beam is a constant, and the length of run is a function of the beam and not a function of the length of the vessel, as has been taught heretofore.

The optimum length of run may be defined as the least or minimum length of the afterbody having a given coefficient of fineness that will fair all water passing the midship section, or will produce the least eddy disturbance in said water.

A reference to the drawings will make the foregoing clearer.

If, in Fig. 1, we divide the boat 8, at the midship section 1, and consider the volumes of the forebody and of the afterbody compared with the respective volumes of the forward and after portions of the inclosing half-cylinder 7, having a base equal to the midship section 1; then the ratio or percentage that the volume of the forebody of the boat 8, having the successive sections 4, 5 and 6, etc., bears to the volume of the corresponding forward portion of the half-cylinder 7, is the coefficient of fineness of said forebody. Again considering the afterbody of the boat 8, containing the sections 9, 10 and 11, etc., the ratio of the volume of the afterbody to the volume of the corresponding portion of the half-cylinder 7, is the coefficient of fineness of said afterbody. This ratio here termed the coefficient of fineness has also been known to those skilled in the art as the longitudinal coefficient or prismatic coefficient.

Now prior to my invention it has been customary to have the same coefficient of fineness in the forebody, or that portion of the boat forward of the midship section, as in the afterbody, or that portion of the boat abaft the midship section. Such old style construction is illustrated in dotted lines in Fig. 2, wherein 13 represents the midship section, 14 the forebody, and 15 the afterbody of an old style boat. In this boat, it will be further seen that the afterbody 15 is as long as the forebody 14, it being, prior to my invention, believed that the length of the afterbody should depend upon the length of the whole vessel, and not upon the length of the beam as I have discovered.

In other words, a vessel built in accordance with my invention will have a forebody 16, see full lines in Fig. 2, extending a greater distance forward of the midship or greatest section 17, than does the afterbody 18. Not only is the forebody 16 of a greater length than the afterbody 18, but the forebody is provided with a coefficient of fineness which differs from the coefficient of fineness of the afterbody. Accordingly, considering a vessel built prior to my invention, having a given displacement, equal lengths of forebody and afterbody and the same coefficient of fineness in each half, or throughout the hull, as is illustrated in dotted lines in Fig. 2; then a vessel built according to my invention having the same displacement, the same length, the same maximum or midship section, and the same coefficient of fineness for the entire vessel, would yet have a longer and sharper forebody 16 and a shorter and relatively fuller afterbody 18, as is illustrated by the full lines in Fig. 2. The differences of shape between my vessel and the present style of vessel are further emphasized in the sectional views shown in Figs. 3 and 4. The advantages of this change of shape or design constituting my invention, will presently appear, but an essential feature of my new design is the optimum length of run in the afterbody 18, which is the least length that will efficiently fair all the water passing the midship section, or that will create the least disturbance in the water leaving the hull.

This optimum length of run, from the standpoint of propulsion, varies somewhat with the shape and the fineness of the lines of the afterpart of the hull; but for sea-going vessels, having transverse stern sections of V-shape, the optimum length of run may be defined as between three and four times the maximum beam, measured at the normal load water line. For vessels having broad flat sterns, the optimum length of run is somewhat less, and while the broad flat stern is slightly superior in smooth water, as regards the well known residuary resistance; it is apt to have an unnecessary area of wetted surface and is objectionable from a structural and sea-going point of view. For this reason I prefer to make the stern sections of the normal V-shape usually employed in sea-going high speed vessels.

If the length of run is made less than the optimum, the disturbance of the water in the wake is increased, with corresponding increase in residuary resistance. On the other hand, a length of run greater than the optimum causes an increase in frictional resistance, and although this is offset by some decrease in residuary resistance, due to the added length of hull, I have found it to be more advantageous to dispose such excess of length of body forward of the midship section, where it increases the length of the forebody 16, or entrance of the ship, as will be clear from the foregoing.

In the case of vessels with a total length equal to, or less than six beams, it is obvious that the optimum length of run can seldom be employed and in consequence the length of the hull in such vessels is commonly divided in the present type of vessels, equally between the length of run or afterbody 15, and the length of entrance or forebody 14. In the case, however, of vessels having a total length on the water line greater than six times the maximum beam; that is, a length more than twice the optimum length of run for the given beam, the excess of length may be and is, advantageously added to the length of entrance, as above stated, thereby making the length of entrance greater than the length of run, and in consequence the position of the midship section is moved a corresponding distance aft from the mid-length of the hull.

Such increase in the length of entrance reduces the wave-making resistance and at the same time, the run being given its optimum length handles all water passing the midship section in the most efficient way.

A little consideration will now show that the position of the midship section 17 relative to the after perpendicular, is fixed, being distant the optimum length of run 18; and that the length of entrance is the greater, as it varies with the length of the ship. The excess of length of entrance 16, compared with the length of run 18, is from as low as one-fourth of the beam, to five times the beam in extremely long vessels having a water line length of twelve beams. For illustration, the length of run being the optimum, (and for this example assumed with a constant length of three and one-half times the maximum beam) the length of entrance 16 for a hull eight beams long will equal four and one-half beams; for a hull of ten beams, the length of entrance will be six and one-half beams, and for a hull having a length of ten and one-half beams the length of entrance will equal seven times the beam. In this last instance the length of entrance is equivalent to and therefore has all the advantages of the entrance of a vessel of the usual construction, fourteen beams in length, having the maximum midship section situated as is usual, equidistant from the ends of the hull.

It results from this shift in the midship section that the length of the vessel on the water line is divided into unequal parts forward and abaft said section; the areas of the load water line forward and abaft, and the displacement are also divided unequally. Further, it thus lies in the power of the naval architect to employ primary variable coefficients, which in an ordinary vessel are usually constants for the entire hull, and to assign to each coefficient different values for the forebody and afterbody as may be most advantageous. In fact, he may in my invention, split up each coefficient and make the coefficient for that portion of the hull forward of the midship section larger or smaller, as the case may be, than the corresponding coefficient of that part abaft the midship section. These coefficients referred to are the coefficients of fineness; the water line coefficient, and the ratios of the beam to the lengths respectively of the forebody and the afterbody.

This ability to split up these coefficients enables me to adjust the relative displacements of the forebody and the afterbody; also by employing a relatively smaller coefficient of fineness for the afterbody than for the forebody, it is practicable to employ the minimum length of run. It is this employment of a low coefficient of fineness for the afterbody that enables the optimum length of run to be reduced to the minimum; while at the same time, the use of a higher coefficient of fineness for the forebody is made possible by the increased length of entrance; the final result being, that the easy lines of the afterbody enables it to fair the water displaced by the relatively greater displacement of the forebody, without material increase in eddy resistance.

As the forebody is lengthened, the reduction in resistance due to increase in the length of entrance, continues to be an important factor until the entrance has a length of five to six beams, beyond which the relative gain in the reduction of resistance, although notable, becomes progressively less with further additions to the length of entrance.

It follows that vessels built according to my invention, designed for high speeds, say for 30 knots or more, may have any excess of length of entrance utilized and any undue sharpness of the bow corrected, while securing a further reduction in resistance per ton of displacement, by enlarging the displacement of the forebody.

Such enlargement in displacement may be made in different ways; for example, by increase in the beam, or in the draft; or by an increase in both beam and draft; also by an increase in the midship section coefficient, or preferably by an increase in the coefficient of fineness of the forebody.

A specific example may be found in a torpedo boat destroyer of the usual dimensions now in use in our Navy, or having a length say, of 10.5 beams, the length of run being 3.5 beams and its coefficient of fineness 0.57 to 0.60. In such case the length of entrance will be seven beams, and its coefficient of fineness may be 0.70 to 0.78, thus considerably enlarging the displacement and making the coefficient of fineness of the entire hull 0.66 to 0.70 without unduly increasing the resistance.

This invention also enables the greatest midship section to be shifted aft to the most advantageous position for the installation of the motive power. That is to say, compared with a vessel of the normal form having the same length, beam, etc., the greatest breadth of the hull is placed farther aft, so that the boiler rooms and engine rooms are widened, giving relatively a generous space for the machinery. Furthermore, these heavy weights are placed over the broadest beam, where they are most easily borne.

In a ship of the usual form, the center of gravity of the load water line and the center of gravity and center of buoyancy of the ship, completed, are situated at or near the midship section; that is, at the mid-length of the hull. In the new form described, the center of gravity of the load water line and also the centers of buoyancy and of gravity of the ship, are all moved aft from the midlength of the hull; the position of the several centers named being determined by the relative proportions of the forebody and the afterbody; the position of the center of gravity relative to the center of buoyancy being finally fixed by the disposition of weights and by the load of the ship.

Another effect of shifting aft the midship section is to greatly increase the relative breadth of the after part of the hull, with a consequent increase in the area of support of the stern portion of the vessel. Owing to this, and also owing to the ship trimming about its center of buoyancy as a center, there is a less tendency in the new style of vessel for the stern to squat at high speeds.

In the foregoing disclosure of the position of the midship section, it is to be understood that these vessels, although of a different configuration from the old style, are yet of the standard form, or as it is sometimes termed, the normal form, and do not otherwise than herein stated, radially depart from the usual naval construction. In cases where the plane of the midship section is not vertical, but is inclined either forward or aft, the midship section for the purpose of this invention may be treated as occupying a substantially vertical plane, its intersection with the normal load water line determining the position of the greatest beam, as hereinbefore stated.

In the case of vessels having a parallel middle body, as illustrated in Fig. 6, the length of the parallel body 25, is considered as deducted from the total length of the hull; the length of entrance being the length of all that portion 16 of the hull situated forward of the parallel middle body 25, and the length of run the length of that part 18 of the hull abaft the parallel middle body 25.

The foregoing new principles of construction have been demonstrated by a long series of tests carried out in the model basin at the Washington Navy Yard. When my new style of vessel is compared with the latest destroyers built by the Government having substantially the same ratio of length to beam, and whose trials have been published, the results of these tests show conclusively that materially less power is required to drive my form of vessel at the speeds attained in said trials.

Not only do the above tests demonstrate the great advance in naval architecture that is achieved by my invention, but these said tests also demonstrate the great advantage of employing fins on the hull in the position and of the character now to be described.

These improved fin-shaped guards 30, are placed over each propeller 31, so as to intervene between the propeller and the surface of the water. They are permanently attached to the stern of the vessel and fixed in such position that the angle between the plane of the load water line and the plane of the fin, is such that the plane of the fin is conformable in direction to the stream lines 32 at the maximum or other selected speed of the vessel. The depth of submersion of these fin guards, at normal draft will vary with the draft of the vessel, but will be sufficient, while providing clearance for the screws, to prevent their coming out of water under ordinary conditions of sea, due to the pitching of the vessel. One of the objects of these guards is to cover and protect the screws from injury; as for instance, by collision with docks, or with locks of canals, or by striking floating timber, and in other ways. But independent of their use as guards, these novel fins have in service, other functions that make their employment of special advantage, in that they steady the ship, and at high speeds tend to restrain the bow from rising and the stern from squatting, thereby causing the vessel to trim more nearly on an even keel than it would without the fins. These fins, interposed between the propellers and the surface, also prevent air from being sucked down to the propellers and thereby lessen cavitation. In these ways and in other ways, the effect of these fins is to reduce the motive power required to drive the vessel.

My fins or guards 30 should be carefully distinguished from those submerged guards, formed by flat arms or loops of metal extending around or encircling the screws, and which have a different function from mine.

My invention overcomes the well known disadvantages and defects in the prior underwater guards and differs from them by providing guards that lessen the resistance of the vessel in moving through the water, as well as affording efficient protection to the screws from accidental injury. They are constructed with adequate strength and rigidity to resist deformation under conditions ordinarily occurring in service; and they are shaped like the fins of a fish and fastened to the hull conformable to the stream lines, as described, so as to reduce the resistance of the water to a minimum.

In other words my guards are horizontal or gently inclined planes, or plane-like warped surfaces, interposed between the propellers and the surface; affixed to the hull and reaching outboard so as to cover all exposed parts of the shafts and propellers. They may preferably be shaped like the fins of a fish and are attached to the hull with the plane of each fin conformable to the local stream lines, so as to operate with the least praticable eddying and the least frictional resistance.

A long series of tests carried out at the Washington Navy Yard show conclusively that these said guards when applied to my type of vessel, prevent the sinking of the stern and in this and in other ways lessen the resistance to the passage of the vessel through the water while performing the other functions stated.

I do not confine myself to any special form or shape of these plane-like guards, for they may be widely varied in shape; may be constructed on stream line forms, and may have their upper or lower surfaces convex or concave, as may be found to be most efficient.

These said guards are particularly adapted to coact with an optimum length of run, for they aid in fairing the water passing the stern and add an additional surface against which the water reacts to aid in propelling the vessel, and thereby compensate for the diminished surface of said run.

What I claim is:—

1. A vessel having different coefficients of fineness in its forebody and in its afterbody, and having its midship section located abaft the mid-length of the hull, substantially as described.

2. A vessel having a total length exceeding six beams, a length of run in its afterbody less than four beams, a different coefficient of fineness in its forebody and afterbody, and an entrance of greater length than said run, substantially as described.

3. A vessel having a length of run less than three and a half beams; a different coefficient of fineness in its forebody and afterbody, and an entrance greater than four beams; substantially as described.

4. A vessel having fins inclined to the plane of the load water line; different coefficients of fineness in its forebody and in its afterbody, and having its midship section located abaft the mid-length of the hull, substantially as described.

5. A vessel having fins inclined to the plane of the load water line; a length of run less than four beams, different coefficients of fineness in its forebody and in its afterbody; and a length of entrance greater than the length of run, substantially as described.

6. A vessel provided with screw propellers having a length of run less than four beams; a total length exceeding six beams; fins located between said propellers and the load water line, and a different coefficient of fineness in its forebody from that in its afterbody, substantially as described.

In testimony whereof I affix my signature, in presence of two witnesses.

WALTER P. JENNEY.

Witnesses:
T. A. WITHERSPOON,
JOHN H. SIGGERS.

Copies of this patent may be obtained for five cents each, by addressing the "Commissioner of Patents, Washington, D. C."